United States Patent [19]

Maucher

[11] 4,381,052
[45] Apr. 26, 1983

[54] CLUTCH DISK ASSEMBLY

[75] Inventor: Paul Maucher, Sasbach, Fed. Rep. of Germany

[73] Assignee: LuK Lamellen und Kupplungsbau GmbH, Bühl, Fed. Rep. of Germany

[21] Appl. No.: 215,376

[22] Filed: Dec. 11, 1980

[30] Foreign Application Priority Data

Jul. 27, 1974 [DE] Fed. Rep. of Germany ....... 2436288

[51] Int. Cl.³ ............................................. F16D 43/24
[52] U.S. Cl. .................................................. 192/106.2
[58] Field of Search ................ 192/106.2, 106.1, 70.17

[56] References Cited

U.S. PATENT DOCUMENTS

| 3,327,820 | 6/1967 | Maurice | 192/106.2 |
| 3,428,155 | 2/1969 | Binder et al. | 192/106.2 |
| 3,684,070 | 8/1972 | Maucher | 192/106.2 |
| 3,762,521 | 10/1973 | Dotter | 192/106.2 |
| 3,817,362 | 6/1974 | Rist | 192/106.2 |
| 3,948,373 | 4/1976 | Worner | 192/106.2 |
| 3,974,903 | 8/1976 | Gennes | 192/106.2 |

FOREIGN PATENT DOCUMENTS 1200013 7/1970 United Kingdom .

Primary Examiner—George H. Krizmanich
Attorney, Agent, or Firm—Kontler, Grimes & Battersby

[57] ABSTRACT

Clutch disk assembly includes a hub, a friction lining support disk coaxially surrounding the hub, the friction lining support disk and the hub having mutual relative torsional play force storage means operatively connected between the hub and the friction lining support disk and effective against relative torsion therebetween load friction means ineffective over a first given range of torsional play between the hub and the friction lining support disk and effective over a second given range of the torsional play, the load friction means comprising a friction member and friction means effective over the second given range of torsional play, at least one force-storage device compressible over the second given range of the torsional play being effective through the friction member, and a pair of disk-like members disposed in axial spaced relationship on the hub and fixed thereto against relative rotation therewith, the load friction means being disposed in the axial space between the pair of disk-like members.

20 Claims, 6 Drawing Figures

CLUTCH DISK ASSEMBLY

The invention relates to a clutch disk assembly especially for friction clutches, having mutual relative torsional play between a hub and a friction lining support disk, and including force storage devices effective between these parts against relative torsion therebetween as well as a supplemental or load friction device which is inoperative in one range of the torsional play and operative in another range of the torsional play and which comprises a load friction member including a friction member and friction means operative over the additional or other range of torsional play, and compressible force storage devices additionally effective during the additional or other range of torsional play.

Such clutch disks as have become known from the German Petty Patent DBGM No. 7 228 728 have a friction member in the form of a sleeve which surrounds the hub and has furthermore, on one side of the hub flange and in the axial space between a lining support disk and an opposing or counter disk, a radially extending arm on which two axially extending wings are provided which engage with windows of the hub flange and clamp a helical compression spring therebetween. After a first range of the torsional play, over which the friction member can be rotated in synchromsm with the lining support disk and the opposing counter disk relative to the hub, and neither the corresponding spring nor the corresponding friction linings produce a damping effect, a contour of the hub flange window comes into engagement with one of the wings of the friction member and the opposite end of the spring is braced against a window cutout or recess of the lining support disk and the opposing or counter disk, the friction member being rotated relative to the lining support disk and the opposing or counter disk and the spring is stressed and, in addition, the respective friction linings become effective in the force transmission path between the hub and the clutch linings.

Such clutch disks have the disadvantage, however, that it is not possible, in spite of the wings extending in the axial direction, which are supposed to prevent an eccentric force application to the spring, to prevent an inexact control of the supplemental or load friction device because, due to the spatial structural relationships, no sufficiently rigid construction is possible. In order to avoid the foregoing, a clutch disk with a load friction device has become known from the Germany Petty Patent DBGM No. 7 403 223 wherein, in the axial space between the friction lining support disk and the opposing or counter disk and on both sides of the hub flange, respective friction members are provided that are riveted together, so that the respective control springs, as seen from the center of their circular contact surfaces, are supposed to engage the friction members as well as the lining support disk and the opposing or counter disk always at the same spacing therefrom. Such clutch disks, however, have the disadvantage that the heads of the rivets connecting the two friction members (during the rotation of the friction members relative to the lining support and the opposing or counter disk, which thus occurs over the first range of the torsional play between the hub and the respective disks) rub against the aforementioned disks and the damping characteristic is thereby falsified, or else, cutouts in the lining support disk and in the counter disk are necessary for the rivets connecting the two friction members with each other, the cutouts in turn, having a weakening effect upon these disks. The disks are weakened further by the face that cutouts for the rivets connecting the two friction members with each other are also required in the hub flange.

It is an object of the invention of the instant application to provide a clutch disk assembly of the aforementioned type at the outset which does not have the foregoing disadvantages and which, with optimum strength, avoids canting or inclined pulling of the springs and therby avoids inexact control, and with which, in addition, the possibility exists of avoiding these disadvantages, while using only one control disk.

With the foregoing and other objects in view, there is provided in accordance with the invention, a clutch disk assembly of the aforementioned type wherein two disk-like members, which are secured to the hub against relative rotation therebetween, define a space therebetween extending in axial direction for receiving therein at least the essential parts of a load friction device. Through the provision that these disk-like members which enclose at least the essential parts of the load friction arrangement and are attached to the hub, secured against rotation, have identical (congruent) stop contours for the respective energy storage devices, assurance is provided that these springs, as seen from the center of their circular stop contours, are engageable symmetrically and on the same diameter with both the two disk-like members, as well as the corresponding part of the load friction device i.e. a friction member, as well as are also engageable symmetrically and at the same spacing from the center thereof with the friction lining support disk and a counter or opposing disk connected therewith, respectively.

Especially in the case of clutch disks with a hub flange provided in the axial space between the friction lining support disk and the opposing or counter disk connected with the former by spacer rivets, a particularly simple construction is obtained if, in accordance with an additional feature of the invention, the hub flange forms in axial direction, together with a disk-like member connected to the hub flange, a space for receiving the load friction device, the disk-like member advantageously being a friction member having an annular region surrounding the hub e.g. a disk-like friction member, as well as for receiving friction or slip linings effective between the hub flange and/or the friction member, as well as spring means. It is particularly advantageous, in accordance with yet another feature of the invention, to construct the disk-like friction member in the shape of a dish and to rivet it at the radially outer regions thereof to the hub flange, the friction or slip linings and the spring means of the load friction advice being accomodated by themselves as a unit within this dish-like region of the additional disk part and the hub flange. In order further to increase the strength of the entire disk and thereby, the life of or durability thereof, it is particularly advantageous, in accordance with an added feature of the invention, to provide the additional disk-like member and the hub flange with opposing registered stop contours for the spacer rivets connecting the friction lining support disk and the opposing or counter disk.

An especially advantageous embodiment of the friction device proper, in accordance with an additional feature of the invention, is obtained when the spring means acting in direction toward the load friction member i.e. a load friction disk, such as a cup or plate springs, for example, is braced with its radially outer zone against a radially zone of the disk-like, additional member, and in fact, in the region of the dish-shaped part thereof. It is furthermore advantageous to provide, in accordance with yet another feature of the invention, between the spring means i.e., the cup spring, for example, and the friction or slip lining disposed at that respective side, an intermediate disk which is secured to the additional disk against rotation relative thereto.

The invention of the instant application not only ensures the aforementioned advantages in clutch disk assemblies of the foregoing construction, wherein a lining support disk and an opposing or counter disk enclose the hub flange, but in addition makes it possible to employ load friction devices also in clutch disk assemblies of other construction types by providing, in accordance with another feature of the invention, a load friction device conjointly with a friction lining support disk between which and the hub body torsional play is provided in the axial space between two cover or side disks which are secured to the hub against rotation relative thereto, energy storage devices located between the cover or side disks and the lining support being operative in one range of torsional play, and, in a further range of the torsional play, the load friction device being additionally operative.

The disk can be constructed in such a manner, in accordance with a further feature of the invention, that, after one range of the torsional play, a stop provided at a member secured to the hub against rotation relative thereto becomes effective at the friction member of the load friction device. It is advantageous in this connection in accordance with another feature of the invention, to secure the lining support disk, against relative to another disk-like member, and to enclose the load friction device between the lining support disk and the other disk-like member. In this case, the stop is in the form of a rivet which is secured to the cover or side disks and extends through cutouts formed the lining support disk as well as in the friction member, the cutouts formed in the lining support disk having a length in circumferential direction which corresponds to the total torsional play, and the cutouts formed in the friction member having a length which corresponds to the one or first range of the torsional play.

In accordance with an alternate feature of the invention, the clutch disk assembly is constructed so that a stop, effective between the lining support disk and the friction member, is secured to the friction member, against rotation, relative thereto and it may be further advantageous in accordance with the invention, for the friction member to be secured, against relative rotation, with yet another disk-like part which is provided on the other side of the lining support disk, so that, in such a case also, the respective springs are engageable with all the respective parts on the same diameter and with the same spacing from the center of their circular engagement surface.

In order to reset or return the friction member to the starting or zero position thereof, it is advantageous, in accordance with yet another feature of the invention, to provide the aforementioned first embodiment of the clutch disk assembly with a lining support disk which is located between two cover or side disks, the one or more of the force storage devices acting on the load friction device i.e. coil springs, for example, being disposed in window-like cutouts of the friction member and, in fact, with prestressing in circumferential direction, which is at least equal to or greater than the moment which is applied by the friction or slip linings of the load friction device and through the respective spring means to the friction member i.e. the torque required for twisting or turning the friction member with respect to the friction lining support disk. The opposing stop surfaces, advantageously also formed by window-like cutouts or recesses, and provided for the energy storage device or devices in the friction lining support disk or in the disk-like member secured to the lining support disk and/or in both cover or side disks have the same lenth, as viewed in circumferential direction, as that of the extension of the spring or springs. On the other hand, depending upon the desired damping characteristic the length of the window-like cutouts for the respective force storage devices in the friction member may correspond to the one range of the torsional and the cutouts in the other disk parts, which are associated with the control springs, can be given a length which corresponds to or is greater than the length of the springs, with their dimension not deformed by torsion of the individual parts relative to one another.

In order to ensure the return of the friction member in the other aforementioned embodiment of a load friction device in the clutch disk assembly according to the invention, wherein the load friction device as well as the lining support disk are disposed in the axial space between two cover or side disks that are secured to the hub body against rotation relative thereto, it is advantageous for the window-like cutout in the lining support disk to be longer, in circumferential direction, in accordance with the one range of the torsional play, than the respective window-like cutouts in the friction disk or the additional disk which is secured to the load friction disk through a spacer rivet and/or in the opposing disks, this control spring or control springs being advantageously also disposed in prestressed condition in the cutouts of the load friction disk or of the disk-like part which is secured to the load friction disk and located on the other side of the lining support disk. It is also possible in such disks, however, in accordance with the sesired damping characteristic, to make the cutouts for the control springs in the lining support disk equal to or smaller than the cutouts, corresponding to the one range of the torsional play, in the friction member or in the disk-like part secured to the friction member and/or in the cover disks.

Other features which are considered as characteristic for the invention are set forth in the appended claims.

Although the invention is illustrated and described herein as embodied in a clutch disk assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
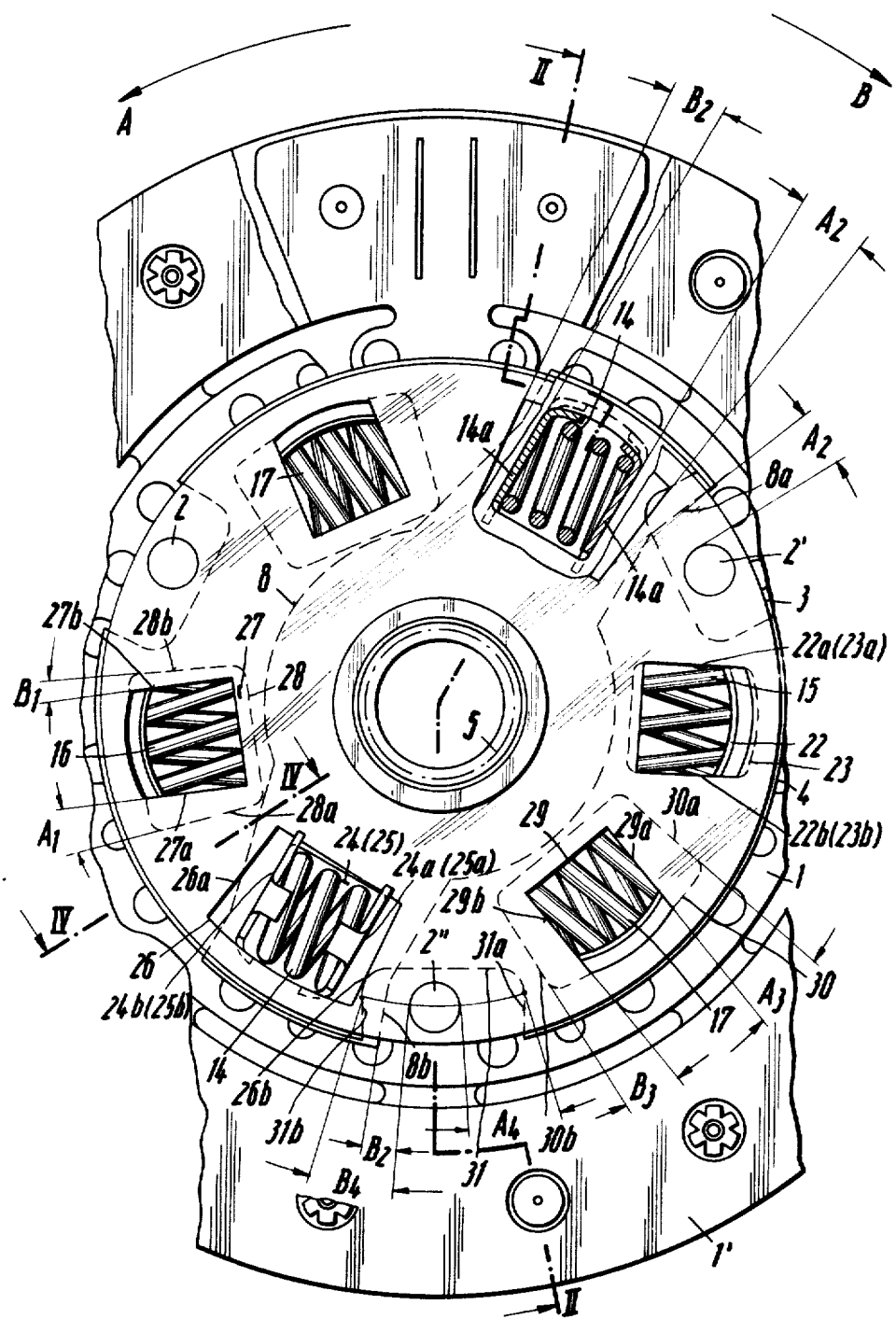
FIG. 1 is a partial elevational view of a clutch disk constructed in accordance with the invention.
Figure 2:
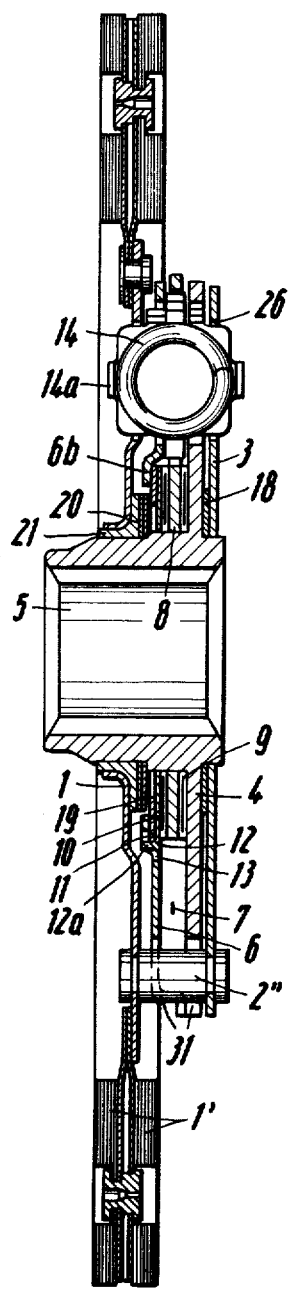
FIG. 2 is a cross-sectional view of FIG. 1 taken along the line II—II in the direction of the arrows.

Referring now to the drawings and first, particularly, to FIGS. 1 and 2 thereof, there is shown a clutch disk, constructed in accordance with the invention, which has a hub 5 formed with a flange 4 disposed in the axial space between a support disk 1 for clutch linings 1' and an opposing disk 3 which is connected to the lining support disk 1 by spacer rivets 2 so as to be secured against relative rotation. The hub flange 4 forms a first disk-like part secured to the hub 5 against rotation relative thereto, and a part 6 forms a second disk-like part secured to the hub 5 against rotation relative thereto. The disk-like parts 4 and 6 together define a space extending in axial direction for receiving therein essential parts of a load friction device 7. The load friction device 7 is formed of a friction member 8 having an annular region extending over the hub, as well as of friction or slide linings 9 provided between the friction member 3 and the hub flange 4, and friction linings 10 provided on the other side of the friction member 8. Further included in the load friction device 7, are spring means, namely a plate spring 11 engaging, on the one hand, the disk-like part 6 and, on the other hand, an intermediate disk 12, which is connected, secured against relative rotation, to the part 6 or the hub 5, respectively, by means of a projection 12a extending in axial direction and engaging in a recess 13 formed in the part 6. A frictional connection between the load friction device 7 and the hub 5 is thereby established.

Figure 4:
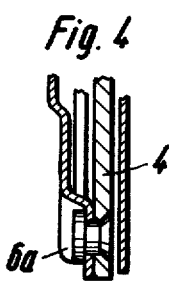
FIG. 4 is a fragmentary cross-sectional view of FIG. 1 taken along the line IV—IV in the direction of the arrows.

The disk part 6 is a dish-shaped and is riveted at radially outer zones 6a thereof to the hub flange 4, as is readily seen in FIG. 4. The radially inner, dish-like region 6b of the disk part 6 extends over the plate spring 11.

Energy storage devices in the form of springs 14, which act in conjunction with the load friction device 7, are furthermore provided in the force transmission path between the hub 5 and the friction linings 1'.

In the just-mentioned force transmission path between the hub 5 and the friction linings 1', three groups of energy storage devices are provided, namely springs 15, 16 and 17, which become operative as damping devices according to different rotary angles of the parts: hub 5/hub flange 4/disk part 6 with respect to the parts: friction linings 1'/lining support disk 1/opposing disk 3. A friction effect is superimposed, furthermore, on the action of the energy storage devices 15, 16, 17 so that a frictional connection is provided between the hub 5 and the friction linings 1' by providing, on the one hand, a friction lining 18 between the opposing disk 3 and the hub flange 4 and, on the other hand, a friction lining 21 which is pressed against the lining support disk 1 through a plate spring 19 and an intermediate disk 20.

The spring 15 is provided in window-like recesses or cutouts 22 formed in the lining support disk 1 and the opposing disk 3 as well as in window-like recesses or cutouts 23 of the flange 4 and the disk-like part 6. Stop or abutment contours 22a and 22b, effective in peripheral direction, are formed in the lining support disk 1 and the opposing disk 3, and stop or abutment contours 23a and 23b in the hub flange 4 and the disk-like part 6 are disposed opposite one another congruently.

The springs 14 belonging to the load friction device 7 are provided in respective window-like cutouts or recesses 24 formed in the load friction member 8 and in window-like cutouts or recesses 25 formed in the hub flange 5 and the disk part 6. End contours 24a and 25a and end contours 24b and 25b, respectively, are disposed congruently or in registry one on top of the other. The springs 14 are embraced by small plates 14a. Furthermore, window-like cutouts or recesses 26 that are congruent or in registry are provided for the springs 14 in the lining support disk 1 and in the opposing disk 3, the recesses 26 being defined by stop contours 26a and 26b, which are spaced from the contours 24a, 24b and 25a, 25b in peripheral direction of the clutch disk.

The spring 16 is disposed in window-like cutouts or recesses 27 formed in the lining support disk 1 and in the opposing disk 3 and embraced by the stop or abutment contours 27a and 27b defining the recesses 27. Stop or abutment contours 28a and 28b of a window-like cutout or recess 28 formed in the hub flange 4 and the disk-like part 6 are spaced from the contours 27a and 27b in peripheral direction of the clutch disk.

Similarly, both springs 17 are also disposed in window-like cutouts or recesses 29 formed in the lining support disk 1 and in the opposing disk 3, the stop or abutment contours 29a and 29b of which abut the ends of the springs 17. Furthermore, the hub flange 4 and the disk part 6 are formed with window-like recesses or cutouts 30 which are defined by stop or abutment contours 30a and 30b for the springs that are spaced apart in peripheral direction of the clutch disk.

The operation of the clutch disk of the invention will now be described in detail especially in conjuction with FIGS. 1 and 3, the clutch disk being considered at a phase thereof wherein the hub 5 is stationary and the linings or the lining support disk 1 and the opposing disk 3, respectively, are rotated relative to the hub 5 in both rotary directions.

Figure 3:
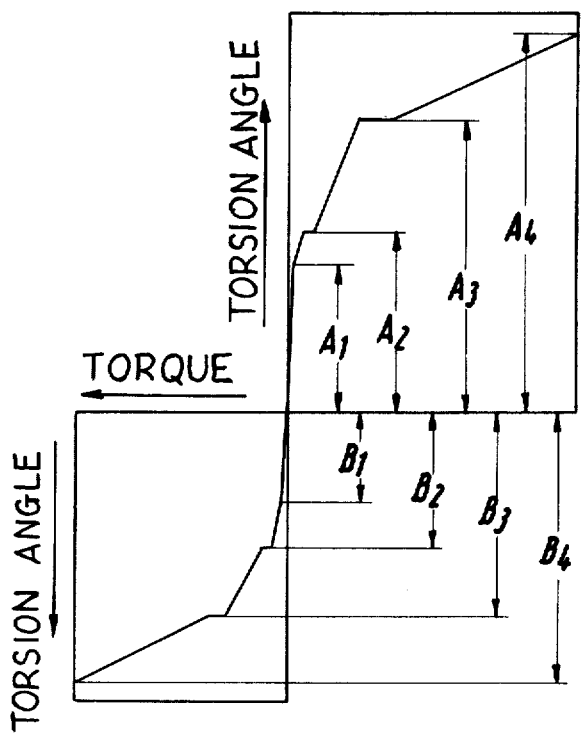
FIG. 3 is a plot diagram of torque and torsional angle defining a possible torque or moment curve of such a clutch disk.

Arrow A in FIG. 1 indicates the direction of rotation i.e. the direction of propulsion, in which the clutch disk is subjected to load while the engine is driving, and the driving wheels are driven thereby (this condition is illustrated in the lower part of the diagram of FIG. 3). Arrow B in FIG. 1 indicates the direction of push or thrust (this condition is illustrated in the upper part of the diagram of FIG. 3), and thus a rotation of the friction linings relative to the hub 5 which occurs when the driving wheels drive the engine.

Over a torsional or turning range A1 in the propulsion direction and B1 in the pushing direction, only the spring 15 is operative, as well as—in addition, over the entire relative turning range—the friction linings 18 and 21, in the force transmission path between the hub 5 and the friction linings 1'. After the torsional or turning range A1 or B1, is passed through, the end turns of the spring 16, which is entrained by the end contours 27a and 27b of the window 27 in the lining support disk 1 and the opposing disk 3, respectively, strike against the end contours 28a and 28b of the window 28 in the hub flange and the disk part 6. The spring 16 is then operative conjointly with the spring 15 from the torsional or turning range A1 or B1 up to the torsional or turning range A2 or B2, respectively.

The friction linings 9 and 10 exert such a frictional force on the load friction member 8 that the latter does not turn with respect to the hub 5 up to the torsion angle A2 or B2, respectively. After the torsion angle A2 has been passed through or overcome, the pin 2' engages the contour 8a of the friction member 8 and entrains the friction member 8 in the direction of the arrow A over the further torsional range, while the pin 2", after the torsional range B2 has been passed through or overcome, engages the contour 8b and entrains the load friction member 8 in the direction of the arrow B over the further torsional range and turns or twists it ralative to the hub 5. At the same time, the end contours 26a and 26b of the windows 26 in the lining support disk 1 and the opposing disk 3 come into engagement with the ends of the turns of the springs 14 during the rotation in direction of the arrows A or B, respectively, these springs 14 becoming effective, as well as the friction linings 9 and 10 when the torsion angle exceeds the angle A2 or B2, respectively.

After overcoming or passing through the torsion angles A3 or B3, respectively, beyond which the springs 17 are entrained by the end contours 29a, 29b of the windows 29, the end turns of these springs 17 engage the end contours 30a and 30b of the windows 30 in the hub flange 4 and in the disk part 6, so that these springs 17 are compressed, in addition to the other springs, when the torsional range exceeds the torsional range A3 or B3, namely, up to the torsional range A4 or B4, respectively. The torsional range A4 or B4, respectively, is limited when the pins 2" come to rest against the end contours 31a and 31b, (congruent in circumferential direction) of the window-like cutouts 31 formed in the hub flange 4 and the disk part 6.

It is readily apparent that in an embodiment of a clutch disk assembly according to the invention, canting or diagonal or oblique pulling of the springs and thereby inexact control, is avoided as the turn ends of all the springs, as viewed from the center of the circular stop or engagement contours thereof, engage symmetrically and on the same diameter, both the lining support disk 1 and the opposing disk 3, and furthermore the friction member 8 as well as the hub 5, due to the disposition of the disk part 6 and congruent stop contours of the spring and pin windows.

Figure 5:
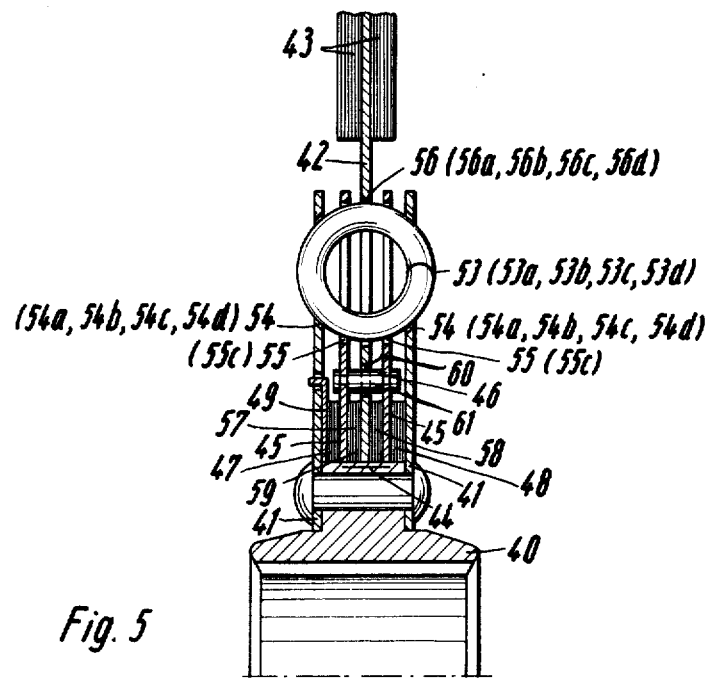
FIGS. 5 and 6 are fragmentary cross-sectional views, similar to FIG. 2, of two additional embodiments of the clutch disk of the invention.

A further possible embodiment of a clutch disk according to the invention will be described hereinafter in detail with respect to FIG. 5 wherein there is shown by example a clutch disk assembly wherein two cover disks 41 are provided at the hub body 40, secured against rotation with respect thereto, as well as a lining support disk 42 for the linings 43, the lining support disk 42 being rotatable relative to the hub 40 and being disposed in the axial space between the disks 41. In accordance with an additional feature of the invention, a load friction device 44 is provided together with the lining support disk 42 in the axial space between the two disks 41. In this embodiment, the load friction device 44 is formed of two load friction members 45 having an annular area extending beyond the hub 40, the two load friction members 45 being mutually connected by a spacer rivet 46, and the load friction device 44 further including friction or slip linings 47, 48, which are stressed or loaded by a plate spring 49 in axial direction. There are further included in the clutch disk assembly embodying the invention as shown in FIG. 5, a group of springs 53, which are offset in circumferential direction, only one of which being shown diagrammatically, the group of springs 53 having an operative disposition corresponding to that of the embodiment shown in FIGS. 1 to 3, for example. The individual springs 53 are provided in respective congruent groups of window-like recesses or cutouts 54 formed in both cover disks 41 and, insofar as the function thereof affects or is concerned with the load friction device 44, in respective congruent recesses or cutouts 55 formed in the load friction disks 45 and, furthermore, in one respective cutout 56 formed in the lining support disk 42. In addition, damper linings 57 and 58, which are stressed against the lining support disk 42 by a corrugated or wave-shaped spring 49, for example, are also provided.

The spacer rivet 46 simultaneously serves as a stop for a recess or cutout 60 extending in circumferential direction in the lining support disk 42. The cutout 60 is defined on both sides of the spacer rivet 46 by stop contours 61 for the spacer rivet 46, the length of the cutout in circumferential direction permitting the one torsional play of the lining support disk 42 relative to the hub body 40, over which the load friction device 44 is inoperative i.e. the load friction members 45 are not rotated relative to the hub 5.

The operation of the clutch disk assembly according to FIG. 5 will be described hereinafter so that a trend or course corresponding to that of the torque curve according to FIG. 3 is produced.

In order to obtain the flat characteristic for the torsion angle A1 or B1, respectively, when the lining support disk 42 rotates relative to the hub 40, a spring 53a, corresponding to the spring 15 according to the embodiment of FIGS. 1 and 2, is provided in corresponding cutouts 54a and 56a, which are of equal size, at least in circumferential direction. For the torsional range extending beyond the torsion angle A1 to the torsion angle A2 and from the torsion angle B1 to the torsion angle B2, a spring 53b, corresponding to the spring 16 according to the embodiment of FIGS. 1 and 2, is provided, which is received in cutouts 54b that are of equal size and for which, in the lining support disk 42, a cutout 56b, corresponding to the torsion angles A1 and B1, respectively, is formed longer in the circumferential direction than the cutouts 54b. For the springs 53a and 53b, cutouts or recesses are either formed in the load friction members 45, or such large windows that are of equal size or are larger than in the opposing disks 41. Up to the torsion angle A2 or B2, respectively, the friction linings 57 and 58 are operative or effective in addition to the springs 53a and 53b, and friction torque or moment of the friction linings 57 and 58 is greater than that of the friction linings 47 and 48.

After exceeding or passing through the torsion angle A2 or B2, respectively, the stop contour 61 of the recess or cutout 60 formed in the lining support disk 42 engages the rivet 46 and entrains the load friction members 45 over the further torsional range. In the course of this entrainment, the friction or slip linings 47 and 48 become effective in the force transmission path between the hub 40 and the linings 43. For the torsional range extending beyond the range A2 or B2, springs 53c, corresponding to the springs 14 in FIGS. 1 and 2, can be retained by the end turns thereof, as in FIGS. 1 and 2, within the cutouts 55c formed in the load friction members 45 and within cutouts 54c of correspondingly equal size thereto that are formed in the side disks 41, and there can be formed in the lining support disk 42, a cutout or recess 56c extending in circumferential direction for such a distance so that these cutouts 56c engage the ends of the turns of the springs 53c only after the torsion angle A2 or B2, respectively, have been exceeded or passed through.

All of the springs 53a, b and c and, due to the rotation of the friction members 45, the friction or slip linings 47 and 48 are then effective or operative over the remaining torsion angle. For the torsion angle exceeding the angle A3 or B3, respectively, namely up to the torsion angles A4 and B4, respectively, which may be limited, in a manner similar to that shown in FIGS. 1 and 2, by stop rivets between the relatively rotatable parts, at least one spring 53d, corresponding to one of the springs 17, may furthermore be provided, for which an appropriately large cutout or recess 56d in the lining support disk 42 is provided, which allows for the torsion angles A3 and B3, respectively. These springs 53d are provided in cutouts 54d of the side disks 41 and are retained by the end contours thereof.

In a clutch disk assembly constructed in accordance with the foregoing description, the springs per se are not rotated or twisted relative to the hub body. However, an embodiment is also conceivable, wherein, for example, the control spring 53c is rotated relative to the hub 40 through a torsion angle over which it is inoperative, that is, over the torsion angle A2 or B2, respectively, the control spring 53c being held in a corresponding cutout 56c, under prestressing if desired, which corresponds to a condition wherein it exerts no spring force in the force transmission path between the friction linings 43 and the hub 40. Cutouts or recesses 54c and 55c, which allow for a torsion angle A2 and B2, respectively, must then be provided in the side disks 41 and in the friction members 45. Depending upon the damping characteristic that is desired, it is also possible, however, to make the cutouts or recesses 56c for the control springs 53c smaller than, equal to or larger than the corresponding cutouts 55c formed in the friction members 45, both in the last-described embodiment as well as in the embodiment hereindescribed previously thereto.

Figure 6:
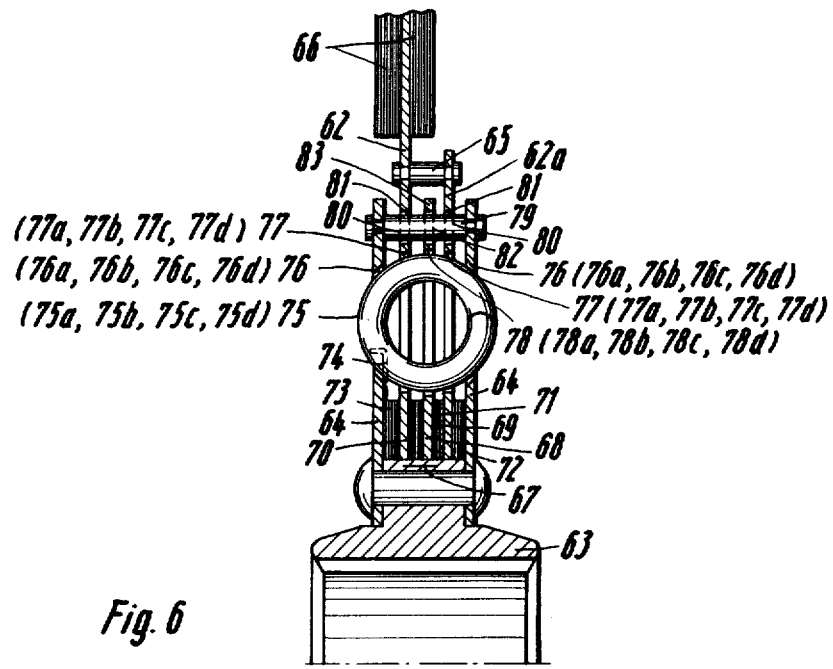

In FIG. 6, another clutch disk assembly according to the invention is shown, which is of the type wherein a lining support disk 62 is provided in the axial space between two side disks 64 that are secured to the hub body 63 against rotation relative thereto. In order that the damper springs may also in this embodiment be made to engage all parts at a distance from the center thereof that is always equal or uniform, another disk 62a is accordingly disposed at the lining support disk 62, thus also in the region between the side disks 64, and thus connected by a rivet 65 to the lining support disk 62, supporting the linings 66, so that the disk 62a is secured against rotation relative to the lining support disk 62. A load friction device 67 is also disposed in the axial space between the side disks 64, which are fixed against rotation relative to the hub 63. The load friction device 67 is formed of a friction disk 68 having an annular area surrounding the hub 63 and of friction or slip linings 69 and 70. In contrast to the embodiment shown in FIG. 5, the load friction device 67 of FIG. 6 is entrained, over a torsional range over which it is inoperative or ineffective, synchronously with the lining support disk 62 and becomes operative or effective, as will be explained in detail hereinbelow, only in a torsion angle extending beyond the last-mentioned torsional range, the load friction device 67 being blocked in the last-mentioned torsion angle over the torsion angle of the lining support disk 62 which extends beyond the former torsion angle.

The friction or slip linings 69 and 70 are stressed in axial direction through a corrugated or wave-shaped washer 71, while friction or slip linings 72 and 73 are acted upon in axial direction by a diagrammatically represented plate or cup spring 74 formed with arms that extend radially outwardly and that are fixedly secured against rotation in circumferential direction.

A group of springs 75, offset in circumferential direction, is provided in a respective associated group of cutouts or recesses 76 formed in the side disks 64, in a corresponding group of cutouts or recesses 77 formed in the parts 62 and 62a, and in a corresponding group of cutouts or recesses 78 formed in the load friction member 68.

Hereinafter, the operation of the clutch disk assembly of the invention as shown in FIG. 6, will be described in a manner that a curve or plotted course corresponding to that of the torque curve according to FIG. 3 is produced, whereby once again the functional or operative disposition of the springs of the spring group 75 corresponds to that of the embodiment shown in FIGS. 1 and 2.

A spacer rivet 79, which connects the two disks 64 one with the other, serves on the one hand as a stop which becomes effective after the torsion angle A4 or B4, respectively, has been exceeded or passed through, in that the stop contours 80 of the cutouts 81 in the part 62, 62a, those stop contours being provided on both sides of the stop, come into engagement therewith after the torsion angle A4 and B4, respectively, has been exceeded.

The spacer rivet 79 serves, in addition, as a stop for the stop or abutment contours 82 of the cutout 83 in the load friction member 68, the abutment contours 82 being provided on both sides of the stop and permitting a rotation or turn of the load friction member 68 in accordance with the torsion angle A2 or B2, respectively.

To obtain the flat characteristic curve for the rotation of the lining support disk 62 relative to the hub 63 for the torsion angle A1 or B1, respectively, a spring 75a corresponding to the spring 15 according to FIGS. 1 and 2 is provided, the spring 75a having end turns engaging the end contours of the equal-size cutouts 76a and 77a, in the starting position. For the torsional range extending beyond the torsion angle A1 to the torsion angle A2 and from the torsion angle B1 to the torsion angle B2, respectively, a spring 75b, corresponding to the spring 16 according to FIGS. 1 and 2, is again provided, the spring 75b being retained in equal-size cutouts 76b formed in the disks 64. The cutouts 77b in the parts 62 and 62a, are made longer than the cutouts 76b in the circumferential direction to an extent that admits of the torsion angle A1 and B1, respectively. The friction or slip linings 72 and 73 are operative up to the torsion angle A2 and B2, respectively, in the force transmission path between the hub 63 and the linings 66. Either cutouts or windows 78a and 78b formed in the disks 62 and 62a are provided in the load friction member 68, for receiving the springs 75a and 75b therein.

After the torsion angle A2 and B2 is exceeded, the stop contour 82 in the cutout 83 of the load friction member 68 engages the pin 79, the load friction disk 68 being stopped for the torsional range beyond this, and the effect of the friction linings 69 and 70 being added to the effect of the friction linings 72 and 73.

For the torsional range of the lining support disk 62 with respect to the hub 63 that exceeds the torsional range A2 and B2, respectively, springs 75c corresponding to the springs 14 in FIGS. 1 and 2 may be provided, the springs 75c being held or confined in equal-size recesses or cutouts 77c and 78c formed in the disks 62 and 62a and in the friction member 68. These springs 75c are entrained in both directions of rotation over or through the torsion angle A2 or B2, respectively, and engage the end contours of the windows 76c of corresponding size, beyond the torsion angles A2 or B2, respectively. Similarly, springs 75d corresponding to the springs 17 of FIGS. 1 and 2 may be provided, the springs 75d being held or confined by equal-size cutouts 77d and 78d formed in the disks 62 and 62a and in the friction member 68. These springs are entrained in both directions of rotation over or through the torsion angles A3 or B3 and engage the end contours of the windows 76d, of corresponding size, beyond the torsion angles A3 or B3 respectively.

The return to the starting position relative to the lining support disk 62 is then effected by means of these springs 75c and 75d. However, the reset can be accomplished by means of the spring 75c alone, but then either the window 76d must be made longer or the difference of A3 to A4 or B3 to B4 must be made greater. A suitably large cutout or recess can also be provided, however. In such case, the spring 75c must be disposed in the equal-size windows 77c and 78c of equal size under such prestressing that the frictional torque of the friction lining 69 and 70 is smaller than the prestressing in the ranges exceeding the ranges A2 or B2.

The return or resetting of the parts 62, 62a and 68 from the torsion angles A2 and B2, respectively, to the starting position is effected through the springs 75a or 75b, respectively, the prestressing in the starting position having to be selected so that it is at least equal to the frictional torque of the friction linings 72 and 73.

Similarly to the manner described hereinbefore in conjunction with FIG. 5, it is also possible, however, to make the spring windows in the individual parts of the disks smaller or larger than, or equal in size to one another in the described manner, depending upon the desired characteristic curve.

I claim:

1. A clutch plate, particularly for use in the clutches of automotive vehicles, comprising a first component including a hub and a pair of axially spaced disk-shaped members non-rotatably secured to said hub; a second component rotatable with reference to said first component and including a clutch disk disposed between said disk-shaped members; and means for yieldably opposing rotation of said second component from a neutral position with reference to said first component, including a load friction device interposed between said disk-shaped members and arranged to oppose a second stage of rotation of said second component following a first stage of rotation from said neutral position, said load friction device comprising at least one load friction member and friction means effective during said second stage, said rotation opposing means further comprising a least one energy storing element interposed between said load friction member and said clutch disk on the one hand and at least one of said disk-shaped members on the other hand to be engaged by said clutch disk during said second stage of rotation of said second component, said clutch disk, said load friction member and said one disk-shaped member having window means for said energy storing element.

2. The clutch plate of claim 1, wherein each of said disk-shaped members has window means for said energy storing element and said disk-shaped members have registering edge faces provided in the respective window means and engageable with said energy storing element.

3. The clutch plate of claim 1, further comprising at least one additional energy storing element interposed between said components to oppose rotation of said second component at least during the first stage of movement from said neutral position.

4. The clutch plate of claim 1, wherein said first component further comprises abutment means arranged to engage and hold said load friction member against rotation relative to said first component during the second stage of rotation of said second component from its neutral position.

5. The clutch plate of claim 4, wherein said abutment means comprises a rivet which is secured to at least one of said disk-shaped members, said load friction member and said clutch disk having cutouts for said rivet and the width of the cutout in said clutch disk, as considered in the circumferential direction of said components, determining the maximum extent of rotation of said second component during said second stage.

6. The clutch plate of claim 5, wherein the width of the cutout in said load friction member is such that the rivet entrains said load friction member in response to rotation of said second component during said second stage.

7. The clutch plate of claim 1, further comprising a second disk spaced apart from and arranged to rotate with said clutch disk, said load friction device being disposed between said disks.

8. The clutch plate of claim 7, wherein said second disk has window means for said energy storing element and edge faces provided in such window means to engage said energy storing element during the second stage of rotation of said second component from its neutral position.

9. The clutch plate of claim 1, wherein said energy storing element is installed in said window means in prestressed condition so that it opposes said second stage of rotation of said second component from its neutral position with a first force, said load friction device further comprising means for biasing said load friction member against said second component with a second force which at most equals said first force.

10. The clutch plate of claim 1, wherein the width of window means in said clutch disk, as considered in the circumferential direction of said second component, equals the width of window means in said load friction member.

11. The clutch plate of claim 1, wherein the width of window means in said one disk-shaped member equals the width of window means in said load friction member, as considered in the circumferential direction of said second component.

12. The clutch plate of claim 1, wherein the width of window means in said clutch disk, as considered in the circumferential direction of said second component, is such that the clutch disk engages said energy storing element during the second stage of rotation of said second component from its neutral position.

13. The clutch plate of claim 1, wherein the width of window means in said one disk-shaped member, as considered in the circumferential direction of said second component, is such that the one disk-shaped member engages said energy storing element during the second stage of rotation of said second component from its neutral position.

14. The clutch plate of claim 1, wherein the width of window means in said load friction member, as considered in the circumferential direction of said second component, is such that the load friction member engages said energy storing element only during the second stage of rotation of said second component.

15. The clutch plate of claim 1, further comprising stop means rigid with said load friction member and coupled to said second component.

16. The clutch plate of claim 15, further comprising a second disk, said clutch disk being disposed between said second disk and said load friction member and said stop means engaging with said second disk, said second disk being rotatable with said clutch disk at least during one of said stages.

17. The clutch plate of claim 16, wherein said stop means is rigid with said second disk and said clutch disk has a cutout through which said stop means extends with a clearance, as considered in the circumferential direction of said second component, corresponding to the extent of rotation of said second component during said first stage.

18. The clutch plate of claim 17, wherein said stop means comprises a rivet.

19. The clutch plate of claim 1, wherein the width of window means in said clutch disk, as considered in the circumferential direction of said second component, exceeds the width of window means in said load friction member.

20. The clutch plate of claim 1, wherein the width of window means in said clutch disk, as considered in the circumferential direction of said second component, exceeds the width of window means in said one disk-shaped member.

* * * * *